(12) United States Patent
Richard

(10) Patent No.: US 6,604,018 B2
(45) Date of Patent: Aug. 5, 2003

(54) COMPUTER-CONTROLLED CREMATION REPOSITORY AND ASSOCIATED METHODOLOGY

(76) Inventor: Daniel D. Richard, 305 Rim Shadows Dr., Sedona, AZ (US) 86336

(*) Notice: Subject to any disclaimer, the term of this patent is extended or adjusted under 35 U.S.C. 154(b) by 72 days.

(21) Appl. No.: 09/963,830

(22) Filed: Sep. 25, 2001

(65) Prior Publication Data

US 2002/0062168 A1 May 23, 2002

Related U.S. Application Data

(60) Provisional application No. 60/235,811, filed on Sep. 27, 2000.

(51) Int. Cl.[7] ................................................. G06F 7/00
(52) U.S. Cl. ....................................... 700/225; 700/215
(58) Field of Search ................................ 700/213, 214, 700/215, 225, 226

(56) References Cited

U.S. PATENT DOCUMENTS

| 4,739,595 A | * | 4/1988 | Yamagata ..................... 52/134 |
| 5,496,000 A | | 3/1996 | Mueller |
| 5,625,933 A | | 5/1997 | Neuberger et al. |
| 5,651,117 A | * | 7/1997 | Arbuckle ........................ 705/4 |
| 6,061,607 A | | 5/2000 | Bradley et al. |
| 6,085,249 A | | 7/2000 | Wang et al. |
| 6,414,663 B1 | * | 7/2002 | Manross, Jr. ................ 345/87 |

* cited by examiner

Primary Examiner—Khoi H. Tran
(74) Attorney, Agent, or Firm—R. Neil Sudol; Henry D. Coleman; William J. Sapone

(57) ABSTRACT

A cremation repository stores a multiplicity of containers holding cremated remains of respective individual organisms. In response to a request from a living human patron, the request incorporating an identification of the patron and an identification of one of the containers, a computer is operated to check a database to determine whether the patron is entitled to view the identified container. Where the request is proper or authorized, a robot mechanism is operated to retrieve the identified container from a respective storage location and to deliver the identified container to a predetermined location accessible by the patron. After the patron has completed visitation with the retrieved container, the robot mechanism is operated to return the that container in an essentially unaltered state to the container's storage location. The patron is enabled to order music and optionally other environmental conditions.

19 Claims, 2 Drawing Sheets

COMPUTER-CONTROLLED CREMATION REPOSITORY AND ASSOCIATED METHODOLOGY

CROSS REFERENCE TO A RELATED APPLICATION

This application relies for priority purposes on U.S. Provisional Application No. 60/235,811 filed Sep. 27, 2000.

BACKGROUND OF THE INVENTION

This invention relates to a cremation repository. This invention also relates to an associated method.

It is well known that cemetery space is increasingly difficult to secure in urban areas. Any space which is still available at reasonable distances from town centers has become so expensive that churches and other non-for-profit and commercial organizations cannot easily afford to acquire suitable cemetery space. Cremation is an alternative to which more and more people will inevitably turn. Cremated remains require much less space than full size coffins and may be indeed be stored in buildings. However, the costs of such storage still remains high, in part because of the personnel necessary to care for the cremation urns and to transport them between storage locations and visitation rooms.

SUMMARY OF THE INVENTION

This invention is intended to provide an improved cremation repository and an associated methodology.

A method for operating a cremation repository comprises, in accordance with the present invention, (i) storing a multiplicity of containers holding cremated remains of respective individual organisms, (ii) receiving, from a living human patron, an identification of the patron and an identification of one of the containers, (iii) operating a computer to check a database to determine whether the patron is entitled to view the identified container, (iv) operating a robot mechanism to retrieve the identified container from a respective storage location and to deliver the identified container to a predetermined location accessible by the patron, and (v), after the patron has completed visitation with the retrieved identified container, operating the robot mechanism to return the that container in an essentially unaltered state to the container's storage location.

Thus, the present invention provides a computer-controlled cremation repository where cremation remains are automatically and temporarily delivered to users or patrons upon proper request, enabling survivors to visit with the mortal remains when dessred. In nearly every case, the survivors will not alter or even touch the vessel containing the remains of a deceased loved one. Thus, the computer-controlled repository functions mainly to periodically or occasionally retrieve and replace the cremation storage containers.

It is contemplated that a cremation repository utilizing the method of the present invention incorporates a number of visitation chambers or rooms utilizable by different parties simultaneously. The robot mechanism may include a plurality of robot units each operating independently under control of the computer to alternately retrieve and redeposit cremation remains storage containers. The robots may be self-propelled machines traveling along pre-established paths extending between the vistitation chambers, on the one hand, and the long-term storage locations, on the other hand. The paths negotiated by the robots may be mechanically defined by tracks such as overhanging rails or electronically defined by signal emitting wires embedded in a floor or ceiling. Alternatively, the robot travel paths may be established by software, the robots receiving input by wireless electromagnetic or ultrasonic signals or by monitoring markers positioned along various segments of the travel path. More advanced robots may be used as well, for example, robots equipped with pattern recognition software and one or more sensory systems.

The identification provided by the human patron or user may include an assigned personal identification code which is input to the computer by the patron or user via a keyboard or other interface device. Alternative identification methodologies include magnetic codes and bar codes which may be imprinted on identification cards, tags, rings, etc. Other, more advanced, identification methods are possible, including fingerprint and retinal scans and DNA analysis. Generally, these more advanced methods are unnecessarily sophisticated for most applications of the present invention.

A patron of the cremation repository service may be easily identified by a credit or debit card number which not only identifies the owner as having proper access to one or more cremation remains containers in the cremation repository facility but also facilitates payment by the patron for the services provided at the facility. A credit or debit card account of any individual patron may be charged periodically, for instance, monthly, independently of actual visitations to the repository facility. Alternatively or additionally, a charge may be made to the patron's account every time the patron visits the facility. Moreover, where the repository facility provides ancillary services, as discussed hereinafter, those services may bear respective additional charges. The charges may be made to the accounts of respective users of patrons at the time of requesting or utilizing the basic and ancillary services or thereafter, for example, at the end of the month.

Operating the computer to extract payments for requested or rendered services may include automatically accessing accounts of the users or patrons through a telecommunications network to debit or charge the accounts. The telecommunications network may be a global computer network (the Internet).

Pursuant to another feature of the present invention, the method may further comprise receiving a request from a patron for one of a plurality of predetermined environmental conditions and automatically generating the requested environmental condition for the patron during at least a portion of a period that the patron is visiting with a selected cremation remains container. The requested environmental condition may be a reproduction of sounds selected by the patron. In that case, the generating of the requested environmental condition includes operating a sound reproduction system to perform or reproduce the selected sounds. The selected sounds may be a particular piece of music chosen by the patron, a piece of music by a particular composer or performer designated by the patron, or a piece of music selected randomly by the computer in response to an indication made by the user or patron as to a general kind of music. Alternatively, the sounds selected by a patron and generated by the sound reproduction system may be sounds of nature, exemplarily of a rainforest, an ocean shore, rustling leaves, a brook, etc.

Other environmental conditions modified or generated by the repository computer in response to a patron request may include a visual presentation and a fragrance. The visual presentation and the fragrance may be selected to accord with the selected sounds, particulaly where the sounds simulate a natural environment. A picture of a rainforest, an ocean shore, mountains or a brook, may be projected onto a wall panel or a large flat video display in conjunction with the corresponding sounds. Concomitently, generic smells of those locales may be wafted into the respective visitation rooms.

A cremation repository comprises, in accordance with the present invention, (a) a plurality of storage receptacles holding a plurality of storage containers holding cremated remains of respective individuals, and (b) a robot mechanism disposed proximate to the storage receptacles for accessing the same, the robot mechanism including an entrainment device for entraining at least one of the storage containers at a time. The repository further comprises a computer operatively connected to the robot mechanism for controlling access operations thereof, the computer having a memory storing locations of the storage containers in the receptacles. An input device is operatively connected to the computer for selecting one of the storage containers to be retrieved by the robot mechanism and conveyed by the robot mechanism to a predetermined location.

In accordance with another feature of the present invention, the repository further comprises a payment execution device operatively connected to the computer and the input device for implementing collection of a payment from a user and enabling retrieval and conveyance operations by the robot mechanism only upon collection of a payment. The payment execution device may be connected to a telecommunications network (e.g., the Internet), either directly, or via the repository computer, for debiting accounts of users or patrons in accordance with numbers of visits by the users or patrons to the cremation repository.

As discussed above, the repository may include an environmental control for generating any one of a plurality of predetermined environmental conditions. The computer is operatively connected to the environmental control for automatically operating the same to produce an environmental condition requested by a user or patron. The environmental control may be a sound reproduction system.

In addition, a cremation repository in accordance with the present invention may include environmental controls other than sound reproduction systems. Senses other than hearing may also be provided with appropriate diversion. The sense of smell may be soothed with incense and flower scents, or the smells of fields, streams, seashores, mountains, etc. These fragrances can be sprayed or wafted into visitation chambers of the repository facility and may be selected to accord with selected sounds (seashore smells selected together with surf sound). Moreover, a projection system may be provided to project a selected scene onto a wall. The scene may, for example, be a picture or video of a beach and lagoon, a mountain valley, a pine forest, a cloudscape, a seascape, a pasture, etc., or of the deceased (while alive), alone or with friends and/or relatives.

Visual presentations may include images of meaning to different religions. The images may be of symbols such as multiple-branch candlestick holders, crosses, cross-legged sitting figures, multiply armed figures, etc. The images may be of actual geographical or architectural sites sacred to the different religions.

The computer control of the cremation repository includes security measures for ensuring that users or patrons are able to call only pre-authorized containers of cremated remains.

A methodology and associated repository in accordance with the present invention facilitate access to the remains of deceased individuals by surviving friends and relatives in part by reducing space requirements. Cremation remains may be stored in locations which are not easily accessible; temporary transfer of the remains to visitation areas is implemented by a computer-controlled robotic mechanism.

DETAILED DESCRIPTION

Figure 1:
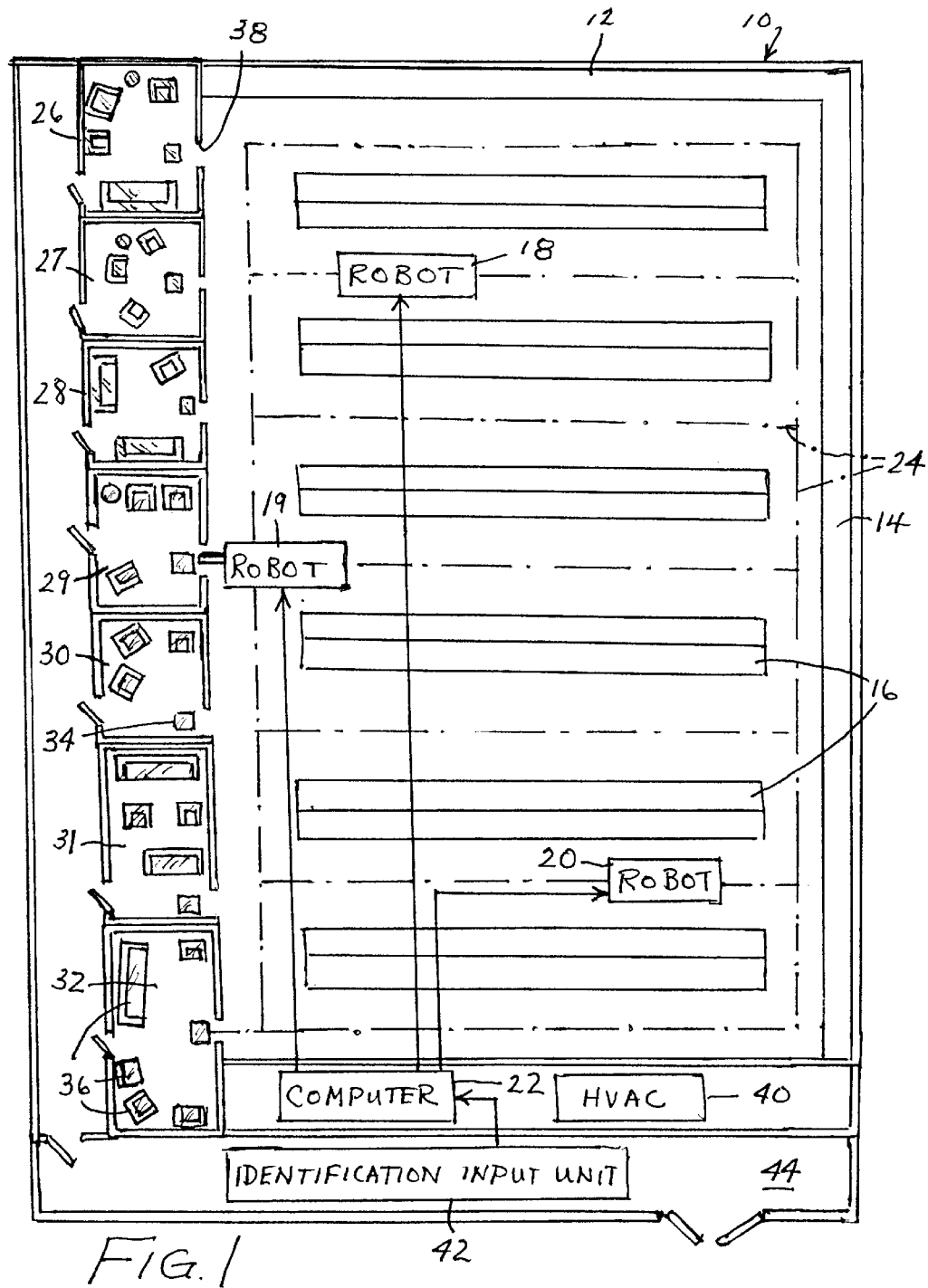
FIG. 1 is partially a schematic plan view and partially a block diagram of a cremation repository in accordance with the present invention.

As illustrated in FIG. 1, a cremation repository includes a rectangular storage area 10 including two sets of wall racks or shelving 12 and 14 and several free-standing sets of racks or shelving 16 for holding urns 17 (FIG. 2) containing remains of respective individuals (e.g., people or pets). Storage racks 12, 14 and 16 are accessed by a plurality of independently operating robots 18–20 controlled by a computer 22. Robots 18–20 move along a network of predefined paths 24 from which the robots can alternately retrieve and deposit cremation urns in assigned locations of storage racks 12, 14 and 16.

The cremation repository also includes a plurality of visitation chambers 26–32 each provided with a stand or table 34 (only one designated) for supporting a cremation urn during a visitation. Each visitation chamber 26–32 is also provided with furniture 36 (only one set designated) for the use of patrons. Robots 18–20 have access to chambers 26–32 via windows or ports 38 (only one designated) for purposes of depositing a requested urn on the respective stand or table 34 and subsequently retrieving that urn to return it to its preassigned permanent storage locations in racks or shelving 12, 14 and 16.

Robots 18–20 may be self-propelled machines traveling along paths 24 extending between the visitation chambers 26–32, on the one hand, and the long-term storage locations in racks or shelving 12, 14 and 16, on the other hand. Paths 24 may be mechanically defined by tracks such as overhanging rails (not shown) or electronically defined by signal emitting wires (not shown) embedded in a floor or ceiling. Alternatively, the robot travel paths 24 may be established by software, the robots receiving input by wireless electromagnetic or ultrasonic signals or by monitoring markers (not shown) positioned along the various segments travel paths 24.

As futher illustated in FIG. 1, the cremation repository includes a heating, ventiliating and air-conditioning unit 40 operatively linked to storage area 10 and to visitation chamebrs 26–32 for maintaining those spaces at desired temperatures and humidity levels. An identification input unit 42 is positioned in part in an antechamber or reception area 44 for enabling computer 22 to identify a user or patron who desires to have a particular urn retrieved and made available for visitation. Identification input unit 42 may be simply a keyboard or keypad by which the patron enters an assigned personal identification code which is associated in the memory of computer 22 with that urn or urns to which the individual patron has proper access. Alternatively, identification input unit 42 may be a magnetic code reader which magnetically scans a code in a magnetic strip of an identification card such as a credit or debit card. This mode of patron identification may also facilitate the collection of a payment for use of the cremation repository. As additional alternatives, identification input unit 42 may be a bar code scanner or may incorporate even more sophisticated technology such as fingerprint and retinal scans and DNA analysis.

Figure 2:
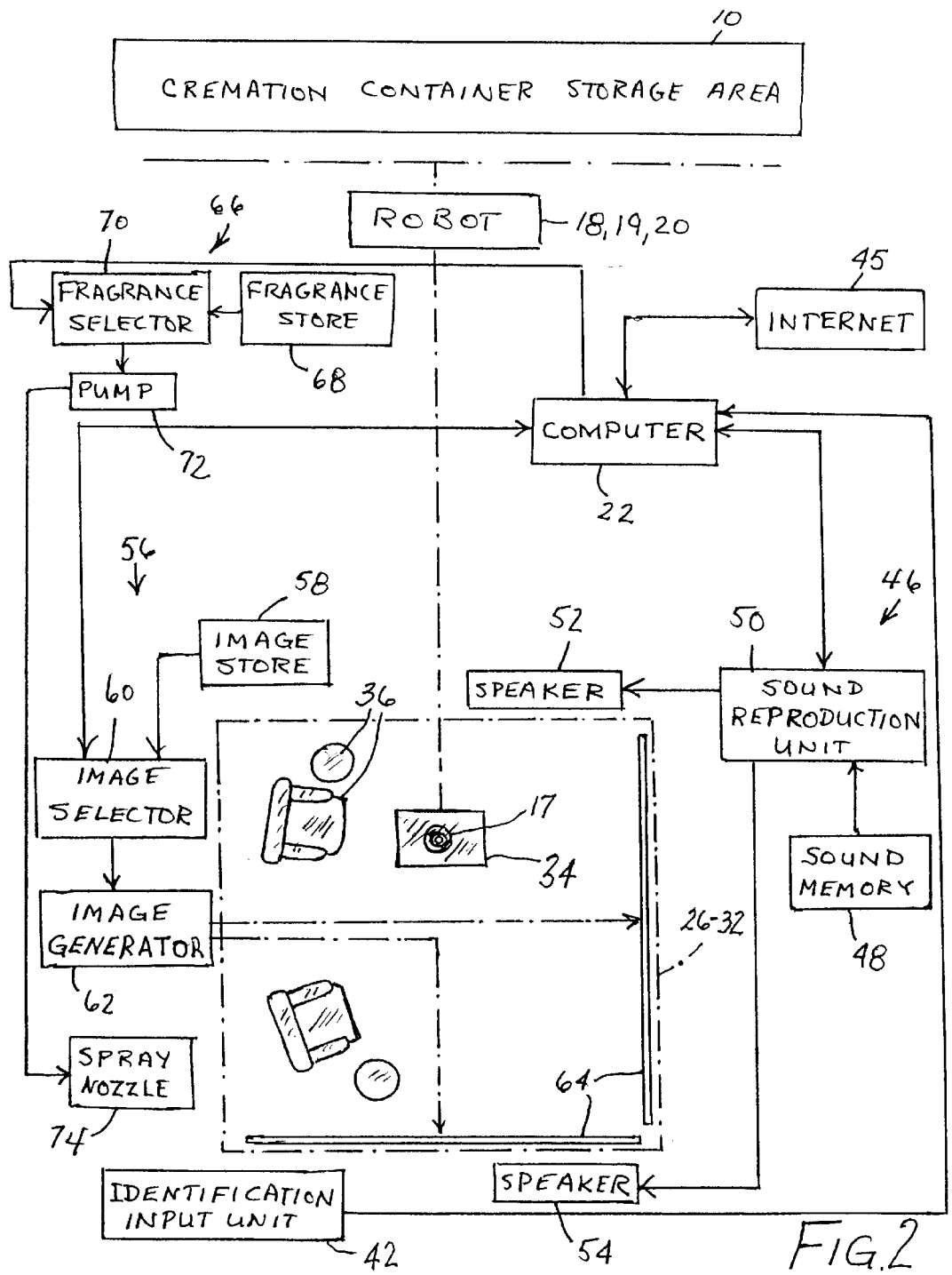
FIG. 2 is a block diagram illustrating functional elements of the cremation repository of FIG. 1.

As illustrated in FIG. 2, computer 22 maybe connected to a telecommunications system or network 45, such as the global computer network called the Internet, for implementing the collections of payments from users or patrons for requested or rendered services. Where computer 22 is provided with credit card or debit card account information, for example, via identification input unit 42, computer 22 may automatically access accounts of the users or patrons through the Internet 45 to debit or charge the accounts.

A credit or debit card account of any individual patron may be charged periodically, for instance, monthly, independently of actual visitations to the repository facility. Alternatively or additionally, a charge may be made to the patron's account every time the patron visits the facility. Moreover, where the repository facility provides ancillary services, as discussed hereinafter, those services may bear respective additional charges. The charges may be made to the accounts of respective users or patrons at the time of requesting or utilizing the basic and ancillary services or thereafter, for example, at the end of the month.

As depicted in FIG. 2, the cremation repository of FIG. 1 further includes an environmental conditioning capability in the form of a sound system 46 comprising a memory 48 of prerecorded sounds, a sound reproduction unit 50 operatively connected to the memory, and a plurality of electroacoustic transducers or speakers 52 and 54 operatively connected to the sound reproduction unit 50. Speakers 52 and 54 are placed in or near a visitation chamber 26–32 for supplying that chamber or room with musical or other sounds selected by a patron using the visitation chamber. Sound reproduction unit 50 is operatively coupled to computer 22 for receiving instructions therefrom for the selection of a particular prerecorded sound from memory 48 pursuant to a request from the patron who has arrived at the repository for a visitation. The request for the particular sound may be communicated to computer 22 via identification input unit 42 where that unit incorporates, for instance, a keyboard and a computer monitor or display. The sounds stored in memory 48 include, for example, classical music selections by various composers, and sounds of nature, such as those found in a rainforest, at an ocean shore, in a mountain wood, along a flowing stream, etc.

As further depicted in FIG. 2, the cremation repository optionally includes visual-environment control system 56 for providing users with visual displays of desired subject matter. Visual-environment control system 56 includes an image store 58, an image selector 60, and an image generator 62. Image store 58 contains a collection of pre-selected encoded images of, for example, various scenes from nature (rainforest, ocean shore, mountain woods, waterfall, etc.), architectural and historical sites (churches, temples, synagogues, sacred walls, pre-historic monuments, etc.), religious symbols (multiple-branch candlestick holders, crosses, cross-legged sitting figures, many arm figures, etc.), the deceased (alive), alone or with friends and/or relatives. Image selector 60 is operatively connected to image store 58 and to computer 22 for selecting images from store 58 in accordance with orders placed with computer 22 via identification input unit 42. Image generator 62 is an image projector or video signal generator for producing selected images on wall panels or large video display screens 64. Of course, the reproduced imagery may include motion, as in a video representation of moving vegetation or water.

Another environmental control system 66 depicted in FIG. 2 is a fragrance generator including a fragrance store 68 holding chemical compositions giving rise to olfactory sensations of various agreeable natural scents, including those of flowers such as honeysuckle, roses, etc., pine forests, oceans or beaches, etc. Fragrance generator 66 further includes a fragrance selector 70 operatively connected to computer 22 and to frangrance store 68 for selecting one or more scents from store 68 in accordance with an order transmitted to computer 22 from identification inut unit 42. A pump 72 is linked on an input side to fragrance selector 70 and on an output side to a spray nozzle 74 for ejecting molecules of a selected fragrance into a visitation room or chamber 26–32.

It will be appreciated that various combinations of environmental conditions may be selected by users pursuant to the user's long-term preferences and momentary desires.

In an extension or modification of the system of FIGS. 1 and 2, friends and relatives who are located at a significant distance from a cremation repository may participate in a visitation via the Internet 45. Images from image selector 60 and sounds from sound reproduction unit 50 may be relayed by computer 22 over the Internet 45 to participating patrons. Video cameras and microphones (not illustrated) may be disposed in visitation chambers 26–32 for electronically capturing a visitation scene and transmitting an image and sounds in real time to a remote participant. In addition, the remote participant might actively contribute to a visitation or memorial ceremony by transmitting images and sounds to a respective visitation chamber 26–32 for reproduction via display and sound reproduction equipment, for example, image generator 62 and sound reproduction system 50.

In a further extension or modification of the system of FIGS. 1 and 2, computer 22 might simply serve as a distributor of graphics, photographs, video images, and sound bites pertaining to a deceased individual, whether a person or an animal or pet. Persons familiar with the deceased may deposit electronically encoded materials relating to the deceased, with the deposited materials subsequently being accessed by patrons or users. Computer 22 thus provides personal memorial services via the Internet 45, without even the necessity for a cremation repository site. The users of the memorial services pay a fee for uploading and/or downloading data. Of course, several remote users may be connected to computer 22 via the Internet 22 for downloading the same visual and auditory material simultaneously. A chat room space may be provided by computer 22 for enabling the various simultaneous users to communicate with one another during a shared remembrance. This communication might involve voice and visual communication, as well.

Although the invention has been described in terms of particular embodiments and applications, one of ordinary skill in the art, in light of this teaching, can generate additional embodiments and modifications without departing from the spirit of or exceeding the scope of the claimed invention. For example, visitation chambers 26–32 may have any shape or arrangement. The walls of the visitation chambers 26–32 may themselves be lined with cremation urns.

In certain cases (for instance, for legal reasons), cremation remains containers are permanently and irremovably stored in numerous different arrangements or configurations, including shelves and racks lining the walls and support pillars of storage chambers located above ground or underground. In such cases, the control computer may operate a lighting installation to visually or optically emphasize a selected urn by providing that urn with a color or intensity of illumination different from the lighting conditions applied to other urns in the same wall. As discussed above, this lighting variation may be accompanied by an audio-visual presentation provided in the same room or on the same computer screen as the selected urn.

Accordingly, it is to be understood that the drawings and descriptions herein are proffered by way of example to facilitate comprehension of the invention and should not be construed to limit the scope thereof.

What is claimed is:

1. A method for operating a cremation repository, comprising:

storing a multiplicity of containers holding cremated remains of respective individual organisms;

receiving, from a living human patron, an identification of said patron and an identification of one of said containers;

operating a computer to check a database to determine whether said patron is entitled to view said one of said containers;

operating a robot mechanism to retrieve said one of said containers from a respective storage location and to deliver said one of said containers to a predetermined location accessible by said patron; and after said patron has completed visitation with said one of said containers, operating said robot mechanism to return said one of said containers in an essentially unaltered state to said storage location.

2. The method set forth in claim 1, further comprising:

receiving, from a another living patron, an identification of said another living patron and an identification of another one of said containers;

operating said computer to check said database to determine whether said another living patron is entitled to view said another one of said containers;

operating said robot mechanism to retrieve said another one of said containers from a pre-established storage location and to deliver said another one of said containers to a selected location accessible by said another living patron; and after said another living patron has completed visitation with said another one of said containers, operating said robot mechanism to return said another one of said containers in an essentially unaltered state to said pre-established storage location.

3. The method set forth in claim 2 wherein said predetermined location and said selected location are different.

4. The method set forth in claim 3 wherein said predetermined location and said selected location are disposed in respective rooms of a cremation repository facility.

5. The method set forth in claim 2 wherein said robot mechanism includes a plurality of robot units, different ones of said robot units being operated to retrieve different ones of said containers.

6. The method set forth in claim 1, further comprising operating said computer to extract payment from an account of said patron.

7. The method set forth in claim 6 wherein the operating of said computer to extract payment includes automatically accessing said account through a telecommunications network to debit said account.

8. The method set forth in claim 1, further comprising:

receiving a request from said patron for one of a plurality of predetermined environmental conditions; and automatically generating the requested environmental condition for said patron during at least a portion of a period that said patron is visiting with said one of said containers.

9. The method set forth in claim 8 wherein the requested environmental condition is reproduction of sounds selected by said patron, the generating of the requested environmental condition including operating a sound reproduction system to perform or reproduce the selected sounds.

10. The method set forth in claim 9 wherein the selected sounds are music.

11. A cremation repository comprising:

a plurality of storage receptacles containing a plurality of storage containers holding cremated remains of respective individuals;

a robot mechanism disposed proximate to said storage receptacles for accessing same, said robot mechanism including an entrainment device for entraining at least one of said storage containers at a time;

a computer operatively connected to said robot mechanism for controlling access operations thereof, said computer having a memory storing locations of said storage containers in said receptacles; and an input device operatively connected to said computer for selecting one of said storage containers to be retrieved by said robot mechanism and conveyed by said robot mechanism to a predetermined location.

12. The repository set forth in claim 11, further comprising a payment execution device operatively connected to said computer and said input device for implementing collection of a payment from a user and enabling retrieval and conveyance operations by said robot mechanism only upon collection of a payment.

13. The repository set forth in claim 12 wherein said payment execution device is connected to a telecommunications network for debiting accounts of users or patrons in accordance with numbers of visits by the users or patrons to the cremation repository.

14. The repository set forth in claim 11 wherein said computer includes means for extracting payment from accounts of users or patrons of the cremation repository.

15. The repository set forth in claim 14 wherein said computer is operatively connected to a telecommunications network for accessing financial accounts of users or patrons to extract payments for user or patron use of the cremation repository.

16. The repository set forth in claim 11, further comprising an environmental control for generating any one of a plurality of predetermined environmental conditions, said computer being operatively connected to said environmental control for automatically operating same to produce an environmental condition requested by a user or patron.

17. The repository set forth in claim 16 wherein said environmental control is a sound reproduction system.

18. The repository set forth in claim 11 wherein said computer includes means for determining whether any given user or patron is entitled to visit with a container of cremated remains selected by said user or patron.

19. A method for operating a cremation repository, comprising:

storing a multiplicity of containers holding cremated remains of respective individual organisms;

receiving, from a living human patron, an identification of said patron and an identification of one of said containers;

operating a computer to check a database to determine whether said patron is entitled to view said one of said containers;

operating a mechanism to optically highlight or emphasize said one of said containers over other containers stored at the same location; and after said patron has completed visitation with said one of said containers, operating said mechanism to return said one of said containers to a condition of optical uniformity with the other urns at said location.

* * * * *